(12) United States Patent
Ciano et al.

(10) Patent No.: US 10,834,227 B2
(45) Date of Patent: Nov. 10, 2020

(54) CONVERSATIONAL AGENT LEARNING MODEL SERVICE SELECTION TO ADDRESS A CLIENT SERVICE REQUEST

(71) Applicant: International Business Machines Corporation, Armonk, NY (US)

(72) Inventors: Giuseppe Ciano, Rome (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 15/895,989

(22) Filed: Feb. 13, 2018

(65) Prior Publication Data

US 2019/0253517 A1   Aug. 15, 2019

(51) Int. Cl.

| | |
|---|---|
| G06F 15/16 | (2006.01) |
| H04L 29/08 | (2006.01) |
| G10L 15/22 | (2006.01) |
| H04L 12/58 | (2006.01) |
| G06Q 50/00 | (2012.01) |

(52) U.S. Cl.
CPC ............. *H04L 67/32* (2013.01); *G10L 15/22* (2013.01); *H04L 51/02* (2013.01); *H04L 67/10* (2013.01); *G06Q 50/01* (2013.01); *G10L 2015/223* (2013.01)

(58) Field of Classification Search
CPC ...................................................... H04L 67/32
USPC ......................................................... 709/203
See application file for complete search history.

(56) References Cited

U.S. PATENT DOCUMENTS

| | | | |
|---|---|---|---|
| 9,172,747 B2 | 10/2015 | Walters et al. | |
| 2010/0057675 A1 | 3/2010 | White et al. | |
| 2012/0290446 A1* | 11/2012 | England | G06Q 30/0282 705/27.1 |
| 2015/0185996 A1 | 7/2015 | Brown et al. | |
| 2015/0363862 A1* | 12/2015 | Ranft | G06Q 30/0631 705/26.7 |
| 2017/0061326 A1* | 3/2017 | Talathi | G06K 9/4628 |
| 2017/0242860 A1* | 8/2017 | Souche | G06N 5/043 |

(Continued)

OTHER PUBLICATIONS

Choosing an enterprise-grade chatbot. livemint, Jul. 24 2017, HT Media Ltd. [4 pages] <http://www.livemint.com/Technology/mKnIXxhGhlaVdTxCX7q4KK/Choosing-an-enterprisegrade-chatbot.html>.

*Primary Examiner* — Hamza N Algibhah
(74) *Attorney, Agent, or Firm* — The Steadman Law Firm PLLC

(57) ABSTRACT

An approach is described with respect to conversational agent learning model service selection in response to a client service request. According to such approach, a model advisor may predict which model service(s) may most appropriately address a client issue. A method pertaining to such approach may include receiving a client service request associated with a client system and data associated with the client service request, wherein the data associated with the client service request includes at least one keyword extracted from the client service request and context information. The method further may include, based upon the data associated with the client service request, selecting at least one model service among a plurality of model services associated with a conversational agent learning model. The method further may include providing the selection of the at least one model service to the client system in response to the client service request.

14 Claims, 8 Drawing Sheets

(56) References Cited

U.S. PATENT DOCUMENTS

2017/0250930 A1* 8/2017 Ben-Itzhak ............ G06F 3/0488
2019/0197106 A1* 6/2019 Doggett .............. G06F 17/2785
2019/0205341 A1* 7/2019 Bala ........................ G06F 16/00
2019/0208056 A1* 7/2019 Dwane ................. G06K 9/6256
2019/0258818 A1* 8/2019 Yu ....................... G06F 21/6245

* cited by examiner

CONVERSATIONAL AGENT LEARNING MODEL SERVICE SELECTION TO ADDRESS A CLIENT SERVICE REQUEST

BACKGROUND

The various embodiments described herein generally relate to a conversational agent learning model (e.g., a bot model, a chatbot model, or a conversational model). More specifically, the various embodiments describe conversational agent learning model service selection in response to a client service request.

Cognitive computing techniques are employed ever more often to address client issues. Computer-based conversational models may provide one or more services to facilitate resolution of such client issues. Given the variety of model services available, determining the best option(s) to address a given client service request conventionally has required querying numerous providers. Therefore, conventional model service selection may entail extensive computational and/or economic cost.

SUMMARY

The various embodiments described herein provide techniques of selecting conversational agent learning model service(s) in response to a client service request. An associated method may include receiving a client service request associated with a client system and data associated with the client service request. The data associated with the client service request may include at least one keyword extracted from the client service request and context information. The method further may include, based upon the data associated with the client service request, selecting at least one model service among a plurality of model services associated with a conversational agent learning model. The method further may include providing the selection of the at least one model service to the client system in response to the client service request. In an embodiment, the context information may include data associated with the client system and information regarding at least one service request related to the client service request.

According to an embodiment, the step of selecting at least one model service among the plurality of model services may include, responsive to determining that a stored service request among a plurality of stored service requests referenced in a prediction database corresponds to the client service request, selecting at least one model service among the plurality of model services that is associated with the stored service request. The step of selecting at least one model service among the plurality of model services further may include, responsive to determining that no stored service request among the plurality of stored service requests corresponds to the client service request, selecting at least one model service among the plurality of model services by evaluating the client service request based upon a plurality of predefined factors. In an embodiment, the step of determining that a stored service request among the plurality of stored service requests corresponds to the client service request may include determining that the stored service request meets input criteria associated with the client service request and determining that the stored service request satisfies at least one predetermined threshold of similarity with respect to the client service request.

According to an embodiment, the step of selecting at least one model service among the plurality of model services by evaluating the client service request based upon the plurality of predefined factors may include classifying the data associated with the client service request and measuring the classified data based upon social media trends. Optionally, the step of selecting at least one model service among the plurality of model services by evaluating the client service request based upon the plurality of predefined factors further may include measuring the classified data based upon at least one cost variable and/or measuring the classified data based upon client configuration. The step of selecting at least one model service among the plurality of model services by evaluating the client service request based upon the plurality of predefined factors further may include selecting at least one model service among the plurality of model services responsive to measuring the classified data and storing in the prediction database an association between the client service request and the selected at least one model service. In an embodiment, the step of selecting at least one model service among the plurality of model services responsive to measuring the classified data may include comparing model service scores respectively calculated for the classified data in the context of each of the plurality of model services.

In an embodiment, the step of measuring the classified data based upon the social media trends may include calculating a sentiment score for at least one aspect of the classified data within a set of social media providers in the context of each of the plurality of model services. In a further embodiment, the step of measuring the classified data based upon the social media trends may include calculating a prevalence score for at least one aspect of the classified data within a set of social media providers in the context of each of the plurality of model services. In a further embodiment, the step of measuring the classified data based upon the social media trends may include calculating a scope score for at least one aspect of the classified data within a set of social media providers in the context of each of the plurality of model services.

An additional embodiment includes a computer program product including a computer readable storage medium having program instructions embodied therewith. According to such embodiment, the program instructions may be executable by a computing device to cause the computing device to perform one or more steps of above recited method. A further embodiment includes a system having a processor and a memory storing an application program, which, when executed on the processor, performs one or more steps of the above recited method.

BRIEF DESCRIPTION OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1A:
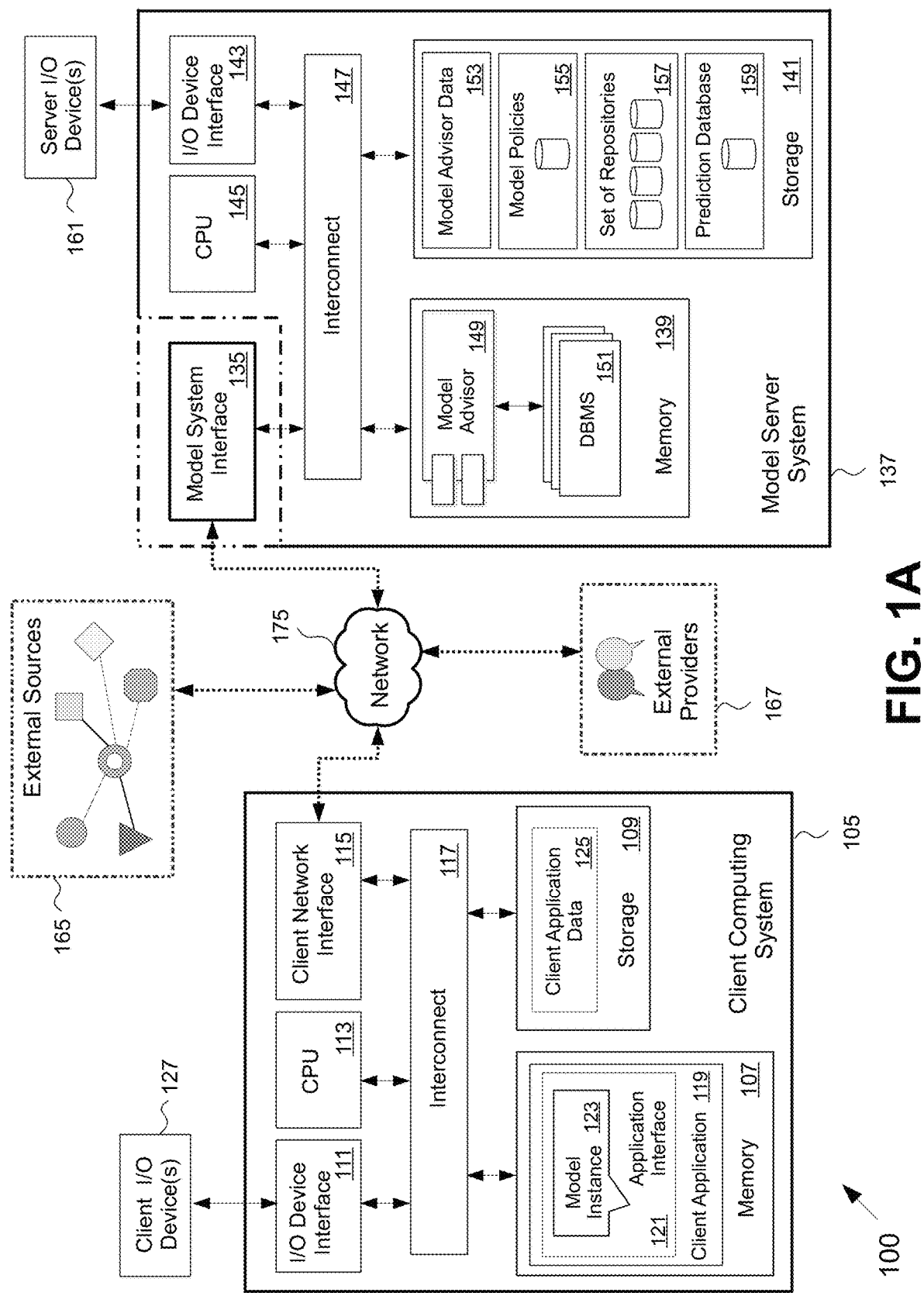
FIG. 1A illustrates a computing infrastructure depicting a client-server configuration with respect to a conversational agent learning model, according to an embodiment.

The various embodiments described herein are directed to techniques pertaining to conversational agent learning model service selection in response to a client service request. According to the various embodiments, in response to a client service request, at least one model service may be selected. Such model service selection may constitute a prediction of which model service(s) may most adequately address the client service request. The selected model service(s) may be provided directly by a model server system or alternatively may be accessed via one or more external service providers.

The various embodiments described herein may have advantages over conventional techniques. Specifically, by facilitating selection of at least one model service in response to a client service request, the various embodiments enable prediction of at least one model service, thus eliminating the necessity of querying multiple model service providers. Accordingly, a prediction according to the various embodiments may minimize any temporal, computational, and/or financial costs required to separately query or otherwise engage multiple paid service providers. Furthermore, selection of at least one model service according to the various embodiments may enable prediction of at least one model service available directly via a model server system and/or at least one model service external to the model server system that may be provided in the form of software as a service. Furthermore, through various evaluation techniques, including use of predefined factors such as social media trends, the various embodiments may improve accuracy over conventional techniques in terms of selecting at least one model service, thus potentially reducing temporal and computational overhead. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and are not considered elements or limitations of the appended claims except where explicitly recited in a claim(s) Likewise, reference to "the invention" shall not be construed as a generalization of any inventive subject matter disclosed herein and shall not be considered to be an element or limitation of the appended claims except where explicitly recited in a claim(s).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions also may be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions also may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The various embodiments described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in the cloud, without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of this disclosure, workloads of a client computing system or server system running an application according to the various embodiments described herein may be deployed to a computing cloud. Moreover, cloud-based database systems, virtual machines, and a variety of other server applications may be used to manage such workloads.

Particular embodiments describe techniques of selecting conversational agent learning model service(s) to address a client service request. However, it should be understood that the techniques described herein may be adapted to a variety of purposes in addition to those specifically described herein. Accordingly, references to specific embodiments are included to be illustrative and not limiting.

FIG. 1A illustrates a computing infrastructure 100, according to an embodiment. As shown, computing infrastructure 100 includes client computing system 105, model system interface 135, model server system 137, external sources 165 (e.g., social networks and/or social applications), and external service providers 167 (e.g., providers of external chatbot services or other external model-based services in the form of software as a service), each of which may be connected to a communications network 175. Although client computing system 105 and model server system 137 are illustrated in FIG. 1A, computing infrastructure 100 may include any number of computing systems and more specifically may include any number of client systems and/or server systems.

Illustratively, client computing system 105 may include a memory 107, storage 109, client input/output (I/O) device interface 111, a central processing unit (CPU) 113, and a client network interface 115, all of which may be interconnected via interconnect 117 (e.g., a bus). Although shown as a single computing system, client computing system 105 is included to be representative of a single client or multiple clients. In an embodiment, client computing system 105 may be a thin client. Memory 107 may include a client application 119. Client application 119 may be an online or network application configured for interfacing with model server system 137 and other computing systems. Client application 119 may include an application interface 121. Specifically, application interface 121 may include a model instance 123 (e.g., a conversational agent, a bot instance, or a chatbot instance) for interacting with a conversational agent learning model via model server system 137. Model instance 123 may include a graphical user interface (GUI) having various elements to facilitate interaction between a client and the conversational agent learning model, e.g., text boxes, radio buttons, drop down menus, etc. Additionally or alternatively, model instance 123 may include a command line interface to facilitate interaction between the client and the conversational agent learning model. Storage 109 may include client application data 125 associated with client application 119. Client application data 125 may include information with regard to any interaction between the client and the conversational agent learning model via model instance 123. Client I/O device interface 111 may be communicatively coupled to one or more client I/O devices 127. CPU 113 is included in FIG. 1A to be representative of a single CPU, multiple CPUs, a single CPU having multiple processing cores, or the like. Client network interface 115 may receive data from, and may transmit data to, model server system 137 via network 175. Client computing system 105 may be configured to interface with other server system(s) within computing infrastructure 100 and/or may be configured to interface with server system(s) external to computing infrastructure 100.

Model system interface 135 may function as a service manager with respect to client computing system 105, as well as any other computing systems interfacing with model server system 137. Model system interface 135 may facilitate communication to and from model server system 137 via network 175. Specifically, model system interface 135 may receive data from, and may transmit data to, client computing system 105 via network 175. According to one embodiment, model system interface 135 may be a computing system separate from model server system 137, including a separate processor, memory, and/or storage. Alternatively, model system interface 135 may be a constituent component (e.g., a software application and/or a hardware entity) of model server system 137.

Model server system 137 may include a memory 139, storage 141, server I/O device interface 143, and a CPU 145, all of which may be interconnected via interconnect 147 (e.g., a bus). Although shown as a single computing system, model server system 137 is included to be representative of a single server system or multiple server systems. Model server system 137 may be an automated service management system. Memory 139 may include a model advisor 149 and a database management system (DBMS) 151. As further described herein, model advisor 149 may be an application that may select, or may facilitate selection of, a conversational agent learning model service in response to a client service request in accordance with the various embodiments described herein. DBMS 151 is included be representative of a single database management system or multiple database management systems. Storage 141 may include model advisor data 153, model policies 155, a set of repositories 157, and a model prediction database 159. Model advisor 149 may generate and process model advisor data 153 based upon interaction with client computing system 105 and/or other computing system(s). Model advisor data 153 may include aspects based upon a corpus of information. The corpus of information may include records from a set of repositories (e.g., set of repositories 157) and external data, including data from social networks or applications (e.g., from external sources 165). Model advisor data 153 further may include a plurality of model services, which may include "on-premise" model services. Model advisor data 153 further may include one or more references to external model services offered through external service providers 167. Model advisor data 153 further may include information with respect to such external model services. Such external model services may be in the form of software as a service. Model advisor 149 may send to DBMS 151 a database query request (e.g., a client service request or other query received from client computing system 105), and DBMS 151 may process such query, e.g., based upon data in the set of repositories 157 and/or based upon data in model prediction database 159. DBMS 151 may include a software application configured to manage the set of repositories 157 and/or model prediction database 159.

The set of repositories 157 may include one or more relational databases. Additionally, the set of repositories 157 may include one or more ontology trees or other ontological structures. While FIG. 1A illustrates four repositories among the set of repositories 157, computing infrastructure 100 may include any number of repositories. Model prediction database 159 may be a relational database. Additionally, model prediction database 159 may include one or more ontology trees or other ontological structures. According to an embodiment, DBMS 151 may send one or more requests to remote databases (not shown) via network 175. DBMS 151 further may include a software application configured to manage model prediction database 159. Model prediction database 159 may include associations between stored client service requests and respective model services. Server I/O device interface 143 may be communicatively coupled to one or more server I/O devices 161. CPU 145 is included in FIG. 1A to be representative of a single CPU, multiple CPUs, a single CPU having multiple processing cores, and the like. Model advisor 149 may accept requests sent by client computing system 105 to model server system 137 via model system interface 135. Model advisor 149 further may transmit data to client computing system 105 via model system interface 135. External sources 165 and/or external service providers 167 may transmit external data to, or may otherwise communicate with, model advisor 149 via model system interface 135.

In an embodiment, one or more functions related to selecting a conversational agent learning model service in response to a client service request may be executed externally to model server system 137. According to such embodiment, model advisor 149 may communicate with application(s) external to model server system 137 in order to obtain information or results related to model configuration and/or model service selection. Furthermore, according to such embodiment, a database management system and database(s) external to model server system 137 may provide to model advisor 149 or other component(s) of model server system 137 information or capabilities necessary for model configuration and/or model service selection.

Figure 1B:
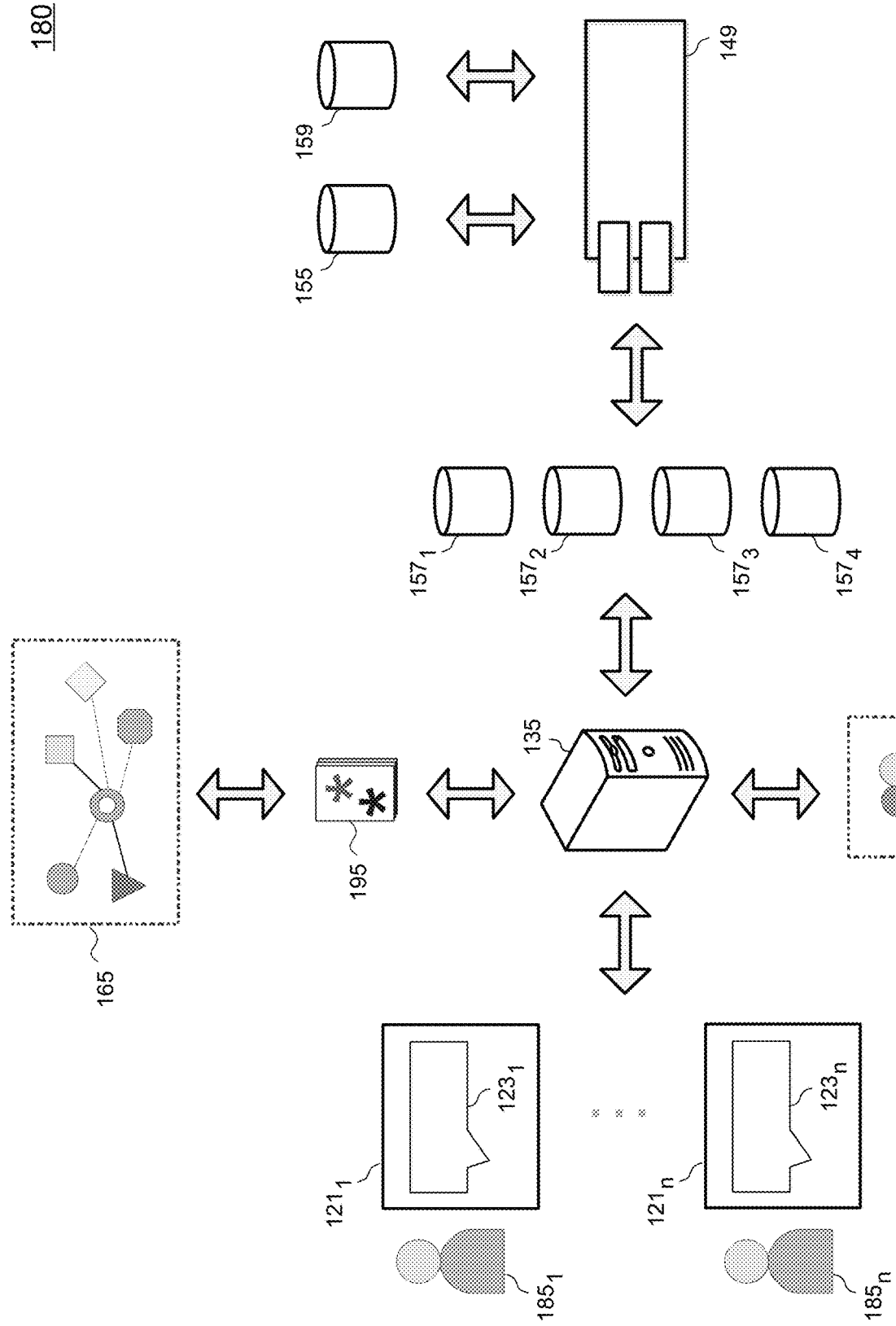
FIG. 1B illustrates a schematic diagram with respect to a conversational agent learning model, according to an embodiment.

FIG. 1B illustrates a schematic diagram 180 with respect to a conversational agent learning model, according to an embodiment. As shown, clients 185$_1$ to 185$_n$ may interact with model instances 123$_1$ to 123$_n$ via application interfaces 121$_1$ to 121$_n$ presented via respective client applications at respective client computing systems. Model advisor 149 may interact with clients 185$_1$ to 185$_n$ via model instances 123$_1$ to 123$_n$ by receiving data from and transmitting data to model system interface 135. Accordingly, model system interface 135 may facilitate communication between clients 185$_1$ to 185$_n$ and model advisor 149. Furthermore, model advisor 149 may obtain external data from, or may otherwise communicate with, external sources 165 via model system interface 135. Specifically, model advisor 149 may obtain such external data via plug-ins 195, which may facilitate data extraction from external sources 165. For instance, one or more of plug-ins 195 may facilitate extraction of user content (e.g., user comments, photos, etc.) from a social network or social application such that the content may be transmitted to model advisor 149 for analysis and/or processing. Additionally, model advisor 149 may communicate with external model services 167 via model system interface 135. According to an alternative embodiment, model advisor 149 may obtain external data from external sources 165 and/or external model services 167 directly.

Furthermore, as shown in FIG. 1B, model system interface 135 may facilitate communication between clients $185_1$ to $185_n$ and the set of repositories 157. In addition, model advisor 149 may communicate with one or more of the set of repositories 157. Specifically, repository $157_1$ may be a client data repository that includes data associated with one or more of clients $185_1$ to $185_n$, such as past client input, comments, etc. Repository $157_2$ may be a knowledge base repository including knowledge base(s). Such knowledge base(s) may include records of various solutions corresponding to respective issues (e.g., client inquiries, problems, and/or tasks, which may be received from one or more client computing systems via one or more of model instances $123_1$ to $123_n$). Such knowledge base(s) further may include analytical information based upon one or more aspects of interaction between the conversational agent learning model and one or more of clients $185_1$ to $185_n$ as well as analytical information pertaining to general aspects of the conversational agent learning model, including repository data, external data, and client information (e.g., service desk analytics). Additionally, model advisor 149 may consult such knowledge base(s) during the process of selecting at least one model service in response to a client service request. Repository $157_3$ may be an incidents/modifications repository, which may include database(s) of incidents and modifications. The database(s) of incidents and modifications may include records of all outstanding issues and/or resolved issues, including records pertaining to any service tickets previously or currently opened to address respective client service requests. Repository $157_4$ may be a log repository including one or more logs. The one or more logs respectively may include records of tracked exchanges of information between one or more clients $185_1$ to $185_n$ and model server system 137. Repositories $157_1$ to $157_4$ among the set of repositories 157 are merely examples. In alternative embodiments, the set of repositories 157 may include a subset of repositories $157_1$ to $157_4$ and/or additional repositories.

Furthermore, as shown in FIG. 1B, model advisor 149 may consult and/or may update model policies 155. Model policies 155 may include a set of rules indicating how and/or when to update one or more of model instances $123_1$ to $123_n$ or other aspects of the conversational agent learning model, such as contents within the set of repositories 157. In an embodiment, model policies 155 may include one or more rules dictating one or more periodic update policies with respect to one or more model aspects. Such one or more periodic update policies may direct an update of one or more model aspects at one or more specified periodic time intervals. Additionally or alternatively, such one or more periodic update policies may direct an update of one or more model aspects based upon changes to knowledge base(s) and/or based upon analytical information (e.g., service desk analytics). In a further embodiment, model policies 155 may include one or more rules dictating one or more administrative update policies. Such one or more administrative update policies may direct an update of one or more model aspects at the discretion of a domain administrator associated with the conversational agent learning model.

Moreover, model advisor 149 may obtain information from, and/or may facilitate update of, model prediction database 159. Specifically, model advisor 149 may obtain information from model prediction database 159 regarding model service(s) associated with respective stored service requests. Such stored service requests may be based upon previous client service requests. Model advisor 149 may facilitate provision of model service(s) associated with respective stored service requests directly via model server system 137 and/or externally, e.g., via external service providers 167. Additionally, model advisor 149 may facilitate information exchange with respect to model service(s) referenced in model prediction database 159. Based upon information in model prediction database 159, model advisor 149 may provide model service prediction(s) to one or more of clients $185_1$ to $185_n$ in response to respective client service requests.

Model advisor 149, model system interface 135, model policies 155, the set of repositories 157, model prediction database 159, and model instances $123_1$ to $123_n$ may constitute key components of a conversational agent learning model (e.g., a bot model, a chatbot model, or a conversational model) in accordance with the various embodiments described herein. Schematic diagram 180 as shown in FIG. 1B depicts an example configuration of model components. Alternative configurations of model components are intended to fall within the protected scope of the various embodiments.

Figure 2:
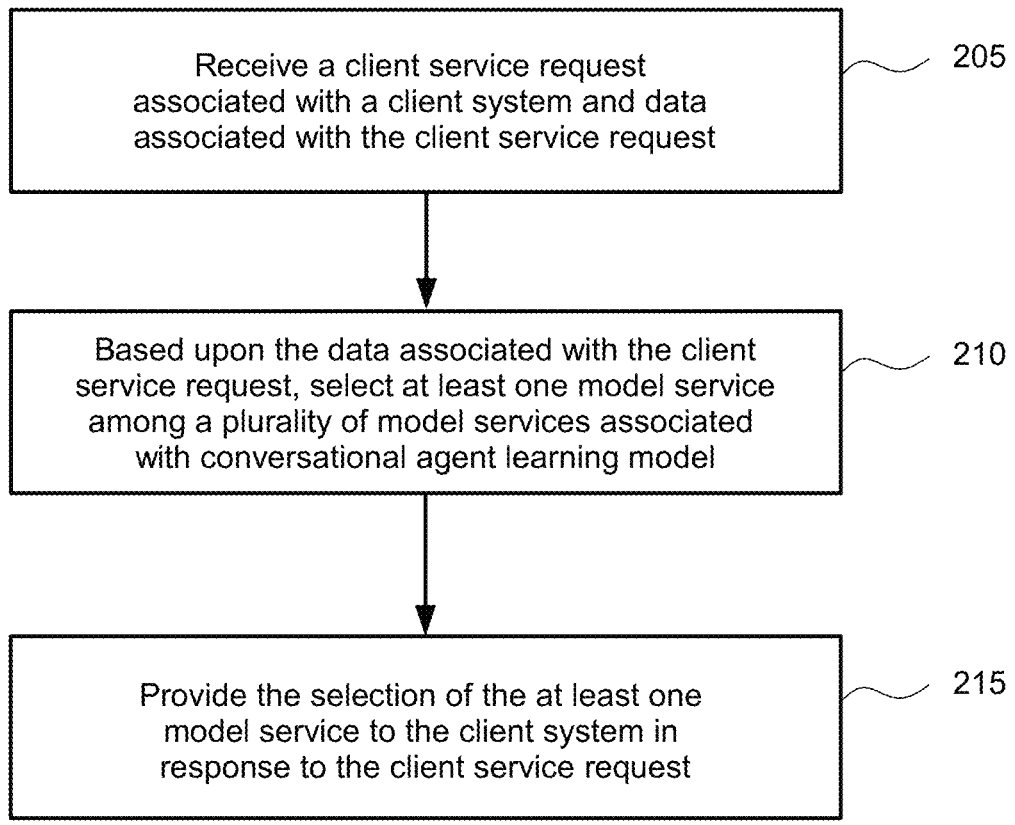
FIG. 2 illustrates a method of addressing a client service request via a conversational agent learning model, according to an embodiment.

FIG. 2 illustrates a method 200 of addressing a client service request via a conversational agent learning model. One or more steps associated with the method 200 and the other methods described herein may be carried out in a client-server computing environment (e.g., computing infrastructure 100). Additionally or alternatively, one or more steps associated with the method 200 and the other methods described herein may be carried out within one or more workloads of a cloud computing environment. Additionally or alternatively, one or more steps associated with the method 200 and the other methods described herein may be carried out in a peer-to-peer network environment, in which case one or more of the method steps described herein may be carried out via a peer application of a peer computing system.

A model advisor of a server system (e.g., model advisor 149 of model server system 137) may facilitate processing according to the method 200. The method 200 may begin at step 205, where the model advisor may receive a client service request associated with a client system (e.g., client computing system 105) and data associated with the client service request. The client service request may be a query submitted by a client to a model system interface (e.g., model system interface 135) via a client application interface of the client system (e.g., application interface 121 of client computing system 105). In the context of the various embodiments described herein, the client may be an individual, a group of individuals, or a computer-based entity having physical access and/or electronic access to the client system. Optionally, the client service request may be submitted via a model instance associated with the conversational agent learning model and accessible via the client application interface of the client system (e.g., model instance 123). The model system interface may be a control desk manager or a service manager. The model system interface along with the model instance may constitute respective portions of a front end of the conversational agent learning model. Upon receipt of the client service request, the model system interface may transmit the client service request and the associated data to the model advisor, which may receive the client service request and the associated data in accordance with step 205. The data associated with the client service request may include at least one keyword extracted from the client service request and context information.

In an embodiment, the context information may include data associated with the client system. Such client system data may include client profile data and/or client asset data. Client profile data may be obtained from a client data repository (e.g., repository $157_1$) and may pertain to computing details of the client system (e.g., associated software) and/or personal details pertaining to the client using the client system. Client asset data may include physical characteristics of the client system, including network access capabilities of the client system, network location of the client system, and/or processing power of the client system. Additionally, the context information may include information regarding at least one service request related to the client service request. Such at least one related service request may have one or more similarities to the client service request, e.g., similar keyword(s) and/or similar service issue(s)/topic(s). Such at least one related service request may originate from the client system and/or other system(s). The model system interface may maintain records of incoming service requests, e.g., in the form of service tickets. Accordingly, the model system interface may identify respective records of service requests related to the client service request by accessing service tickets or other records associated with such related service requests. The model system interface may forward such information to the model advisor, which in turn may receive the information according to step 205. Furthermore, the model advisor may obtain from an incidents/modifications repository (e.g., repository $157_3$) information regarding at least one service request related to the client service request, including information with respect to any service tickets previously or currently opened. The model advisor may use information regarding at least one service request related to the client service request to determine the nature and/or extent of similarities between the client service request and other service requests.

At step 210, based upon the data associated with the client service request, the model advisor may select at least one model service among a plurality of model services associated with the conversational agent learning model. The at least one model service selected by the model advisor may be provided directly by the server system (e.g., "on-premise" model services) and/or may be provided externally through one or more external service providers (e.g., external service providers 165) in the form of software as a service. The model advisor may analyze the at least one keyword extracted from the client service request as well as client profile data and/or client asset data in order to select at least one model service according to step 210. As discussed further herein, the model advisor may select at least one model service associated with a service request stored in a prediction database (e.g., model prediction database 159) responsive to determining a correspondence between the client service request and the stored service request. Responsive to determining that no such correspondence exists, the model advisor may select at least one model service by evaluating the client service request based upon a plurality of predefined factors. An embodiment with regard to selecting at least one model service in response to the client service request according to step 210 is described with respect to FIG. 3.

While the model advisor may select a single model service responsive to determining that the single model service most closely addresses the client service request, the model advisor may select multiple model services responsive to determining that a single model service does not clearly address the request, i.e., responsive to determining upon evaluating respective model services that there is no single model service among the plurality of model services having unambiguous advantages over all other model services. Such situation may arise in the event that the client service request includes multiple aspects (e.g., multiple identifiable issues presented for resolution). For instance, among the plurality of model services, the model advisor may determine that Model Service A best addresses one aspect of the client service request but that Model Service B best addresses another aspect of the client service request. In response, the model advisor may select both Model Service A and Model Service B according to step 210.

At step 215, the model advisor may provide the selection of the at least one model service to the client system in response to the client service request. The model system interface may facilitate provision of the selected at least one model service to the client system. In an embodiment, the model advisor may provide the selection to the client system via a model instance associated with the conversational agent learning model and accessible through the client system or via another aspect or portion of the client application interface. The selected at least one model service provided according to step 215 may constitute a prediction of at least one model service that may be able to address the client service request most adequately. Based upon such prediction, the client associated with the client system may attempt to address the issue in the client service request via the provided at least one model service. Specifically, the client may attempt to access the at least one model service provided by the model advisor at step 215 in order to obtain a resolution to the client service request (e.g., one or more solutions to a problem reflected in the client service request). The client may attempt to consult the provided at least one model service via a model instance.

Figure 3:
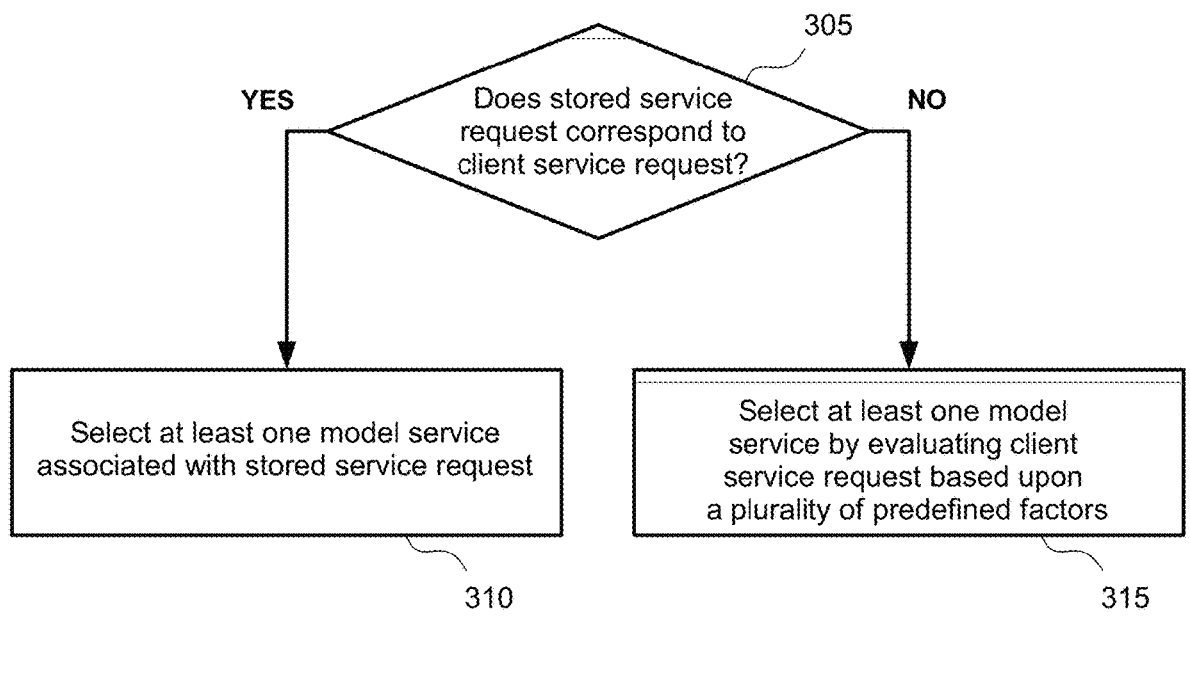
FIG. 3 illustrates a method of selecting at least one model service among a plurality of conversational agent learning model services, according to an embodiment.

FIG. 3 illustrates a method 300 of selecting at least one model service among the plurality of model services associated with the conversational agent learning model, according to an embodiment. The method 300 provides an example embodiment with respect to step 210 of the method 200. The method 300 may begin at step 305, where the model advisor may determine whether a stored service request among a plurality of stored service requests corresponds to the client service request. The plurality of stored service requests may be referenced in the prediction database. According to an embodiment, the plurality of stored service requests may include one or more stored queries. An embodiment with regard to determining whether a stored service request among the plurality of stored service requests corresponds to the client service request according to step 305 is described with respect to FIG. 4. Responsive to determining at step 305 that a stored service request among the plurality of stored service requests corresponds to the client service request, at step 310 the model advisor may select at least one model service among the plurality of model services that is associated with the stored service request. Responsive to determining at step 305 that no stored service request among the plurality of stored service requests corresponds to the client service request, at step 315 the model advisor may select at least one model service among the plurality of model services by evaluating the client service request based upon a plurality of predefined factors. An embodiment with regard to selecting at least one model service by evaluating the client service request based upon the plurality of predefined factors according to step 315 is described with respect to FIG. 5. In the context of such embodiment, the predefined factors may include social media trends, cost variable(s), and/or client configuration.

Figure 4:
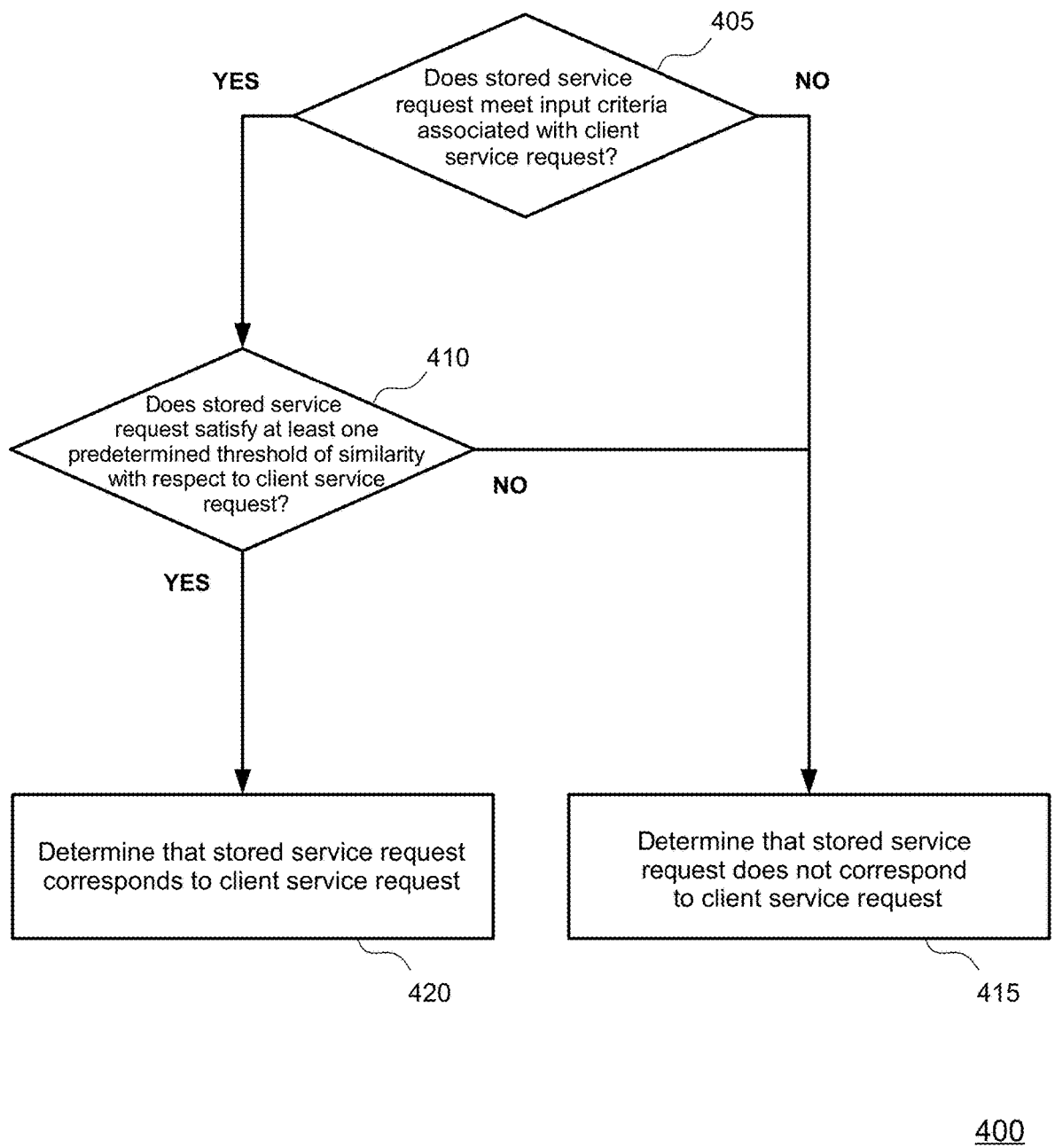
FIG. 4 illustrates a method of determining whether a stored service request among a plurality of stored service requests corresponds to a client service request, according to an embodiment.

FIG. 4 illustrates a method 400 of determining whether a stored service request among the plurality of stored service requests corresponds to the client service request received at step 205, according to an embodiment. The method 400 provides an example embodiment with respect to step 305 of the method 300. The method 400 may begin at step 405, where the model advisor may determine whether the stored service request meets input criteria associated with the client service request.

In an embodiment, the input criteria analyzed according to step 405 may include a keyword requirement. To determine whether the stored service request satisfies the keyword requirement, the model advisor may compare any keyword(s) provided for the stored service request to the at least one keyword extracted from the client service request. For instance, the model advisor may determine whether any keyword(s) associated with the stored service request are identical or synonymous to the at least one keyword extracted from the client service request. Additionally or alternatively, the model advisor may determine whether any keyword(s) associated with the stored service request have an ontological relationship with the at least one keyword extracted from the client service request.

In a further embodiment, the input criteria analyzed according to step 405 may include a topic requirement. The topic requirement may be based upon classification of service requests according to topic. To determine whether the stored service request satisfies the classification requirement, the model advisor may compare any topical classifications of the stored service request with any topical classifications of the client service request to determine topical compatibility. For instance, the model advisor may determine whether any topical classifications associated with the stored service request are identical or synonymous to any topical classifications associated with the client service request. Additionally or alternatively, the model advisor may determine whether any topical classifications associated with the stored service request have an ontological relationship with any topical classifications associated with the client service request. Any topical classifications associated with the client service request may be explicitly designated by the client via the client system and/or may be determined by the model advisor upon receipt of the client service request.

The model advisor may complete keyword comparison and/or topical comparison through use of text comparison (e.g., via one or more string matching algorithms and/or text comparison algorithms) and/or natural language processing. Responsive to determining at step 405 that the stored service request meets input criteria associated with the client service request, the model advisor may proceed to step 410. Responsive to determining at step 405 that the stored service request does not meet input criteria associated with the client service request, the model advisor may proceed to step 415, where the model advisor may determine that the stored service request does not correspond to the client service request.

At step 410, the model advisor may determine whether the stored service request satisfies at least one predetermined threshold of similarity with respect to the client service request. The at least one predetermined threshold may ensure that aspects of the stored service request are within a threshold of similarity to corresponding aspects of the client service request. In an embodiment, the model advisor may make the threshold determination by confirming that any comparison(s) with respect to the input criteria made at step 405 indicate a minimum level of similarity between the stored service request and the client service request. While comparisons that indicate an identical relationship between aspects of the stored service request and the client service request may almost always satisfy the at least one predetermined threshold of similarity, some comparisons that indicate a synonymous or ontological relationship may not satisfy the at least one predetermined threshold of similarity. The at least one predetermined threshold of similarity may be designated by a model administrator. Additionally or alternatively, the model advisor may provide the client an option to calibrate the at least one predetermined threshold. Responsive to determining at step 410 that the stored service request satisfies the at least one predetermined threshold of similarity with respect to the client service request, the model advisor may proceed to step 420, where the model advisor may determine that the stored service request corresponds to the client service request. Responsive to determining at step 410 that the stored service request does not satisfy the at least one predetermined threshold of similarity with respect to the client service request, the model advisor may proceed to step 415, where the model advisor may determine that the stored service request does not correspond to the client service request.

In an embodiment, the model advisor may process respective stored service requests among the plurality of stored service requests according to the method 400 until a stored service request is found that corresponds to the client service request. In an alternative embodiment, the model advisor may process each stored service request among the plurality of stored service requests according to the method 400. According to such alternative embodiment, the model advisor may determine multiple stored service requests that correspond to the client service request in accordance with the method 400.

Figure 5:
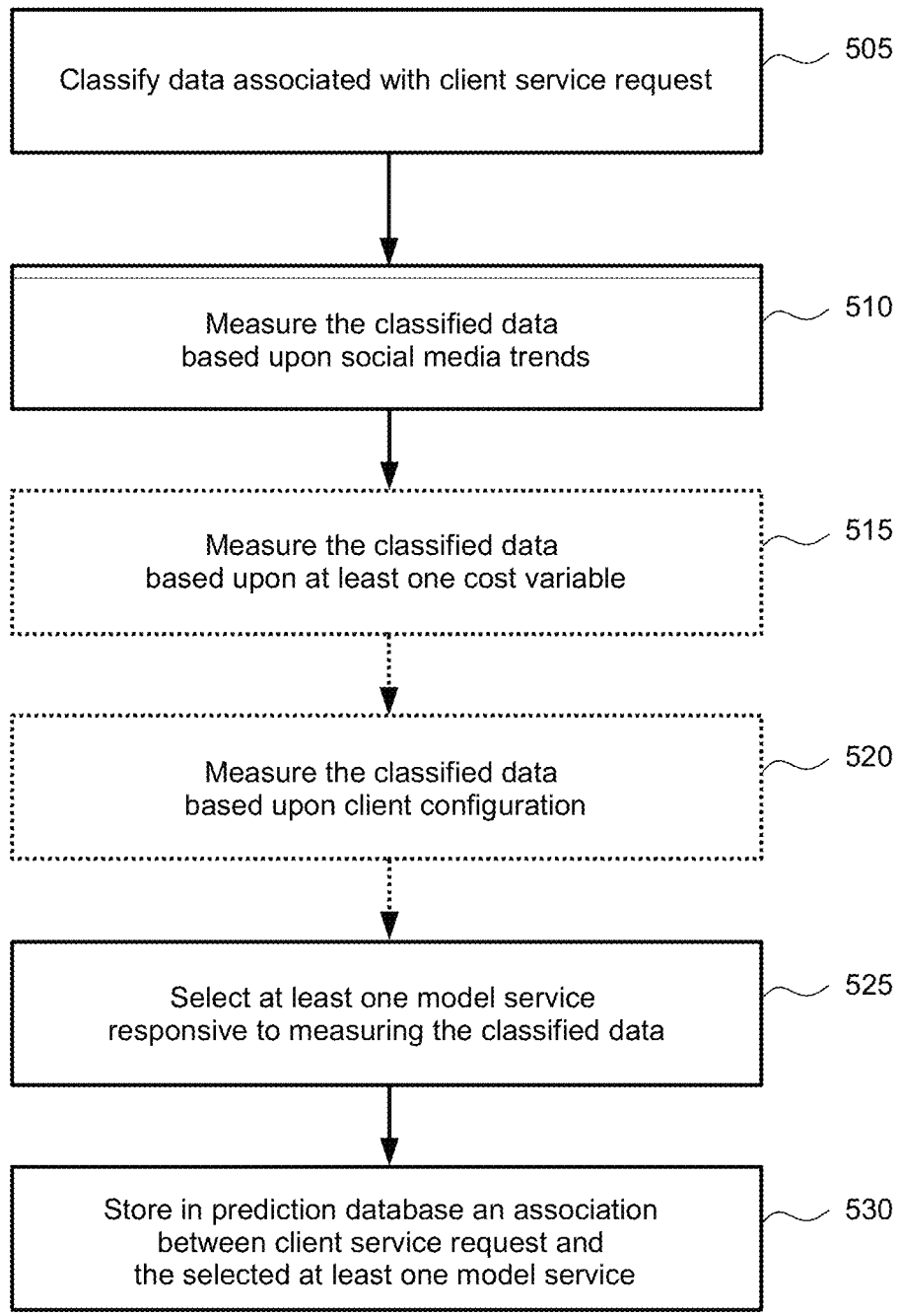
FIG. 5 illustrates a method of selecting at least one model service among a plurality of conversational agent learning model services by evaluating a client service request based upon a plurality of predefined factors, according to an embodiment.

FIG. 5 illustrates a method 500 of selecting at least one model service among the plurality of model services by evaluating the client service request received at step 205 based upon the plurality of predefined factors, according to an embodiment. The method 500 provides an example embodiment with respect to step 315 of the method 300. While social media trends, cost variable(s), and client configuration are the predefined factors discussed in the context of the method 500, the model advisor may evaluate the client service request based upon additional or alternative factors. The model advisor may evaluate the client service request by measuring classified data associated with the client service request based upon the plurality of predefined factors and calculating respective scores for the classified data in the context of each of the plurality of model services associated with the conversational agent learning model.

The method 500 may begin at step 505, where the model advisor may classify the data associated with the client service request. The model advisor may classify the client service request data by analyzing the at least one keyword extracted from the client service request and/or the context information. Additionally or alternatively, the model advisor may classify the client service request data by determining at least one other aspect of the client service request and classifying the at least one other aspect. Specifically, the model advisor may classify the client service request data by identifying at least one topic associated with the client service request, at least one intent associated with the client service request, at least one entity associated with the client service request, and/or at least one potential action (e.g., solution) to address the at least one intent. An intent in the context of the various embodiments described herein may indicate a purpose or a goal. An entity in the context of the various embodiments may be an object class or a data type that enables selection of at least one (potential) action in order to address one or more intents. Upon classifying the data associated with the client service request according to step 505, the model advisor may store the classified data among data associated with the model advisor (e.g., model advisor data 153). Additionally or alternatively, the model advisor may store the classified data in the client data repository.

For example, assuming that the model advisor receives a client service request in the form of a bill payment request from Client Taxpayer, the model advisor may identify a financial topic and a bill payment intent. The model advisor further may identify the bill as an entity. Identifying the bill as an entity in turn may enable the model advisor to identify a potential action upon the bill in order to address the bill payment intent, e.g., processing payment of the bill on behalf of Client Taxpayer. Upon classifying the data associated with the bill payment request from Client Taxpayer according to step 505, the model advisor may store the identified topic, intent, entity, and potential action among data associated with the model advisor and/or in the client data repository.

At step 510, the model advisor may measure the classified data associated with the client service request based upon social media trends. The model advisor may observe the social media trends by monitoring social channels, e.g., through a set of social media providers. The set of social media providers may include a designated set of social networking applications. Observing trends within the set of social media providers may enable the model advisor to measure the classified data within a controlled environment, thus providing a basis for even comparison of the plurality of model services. Specifically, the model advisor may calculate a social media score for the classified data within the set of social media providers in the context of each of the plurality of model services. The social media score may be based upon one or more scores calculated with respect to social media sentiment, social media prevalence, and social media scope. An embodiment with regard to measuring the classified data based upon the social media trends, including calculation of the social media score, is described with respect to FIG. 6.

Optionally at step 515, the model advisor may measure the classified data associated with the client service request based upon at least one cost variable. The model advisor may compare respective costs of each of the plurality of model services in terms of addressing or otherwise processing at least one aspect of the classified data (e.g., at least one topic, at least one intent, at least one entity, at least one potential action, and/or at least one keyword). For instance, based upon the classified data, the model advisor may compare resource utilization costs with respect to identification and/or use of each of the plurality of model services. Specifically, identifying and analyzing one or more of the plurality of model services may incur costs with respect to one or more search services. Based upon the measurement at step 515, the model advisor may calculate a cost variable score for the classified data in the context of each of the plurality of model services.

Optionally at step 520, the model advisor may measure the classified data associated with the client service request based upon client configuration. The model advisor may analyze at least one aspect of the classified data (e.g., at least one topic, at least one intent, at least one entity, at least one potential action, and/or at least one keyword) in the context of the network location and/or assets of the client system to determine which of the plurality of model services may most appropriately address the at least one aspect. For instance, a specific model service may most appropriately address a certain topic or intent identified within the classified data upon consideration of the location and/or the assets of the client system. Based upon the measurement at step 520, the model advisor may calculate a client configuration score for the classified data in the context of each of the plurality of model services.

At step 525, responsive to measuring the classified data associated with the client service request, the model advisor may select at least one model service among the plurality of model services. The selection of at least one model service according to step 525 may constitute a prediction of the model service(s) most appropriate to address the client service request received at step 205. In an embodiment, the model advisor may select at least one model service among the plurality of model services responsive to measuring the classified data by comparing model service scores respectively calculated for the classified data in the context of each of the plurality of model services. According to such embodiment, the model advisor may calculate a model service score for the classified data in the context of each of the plurality of model services and subsequently may compare the respective calculated model service scores. For instance, the model advisor may iteratively compare each model service score to each other model service score. Furthermore, according to such embodiment, the model advisor may select at least one model service in the context of which the model advisor calculates the highest model service score for the classified data. Specifically, the model advisor may select a single model service responsive to determining that the model service score calculated for the classified data is highest in the context of such single model service. The model advisor may select multiple model services responsive to determining that the model service score calculated for the classified data is highest in the context of such multiple model services.

The model service score calculated for the classified data in the context of each of the plurality of model services may be based upon the social media score calculated according to step 510. Moreover, the model service score calculated for the classified data in the context of each of the plurality of model services optionally may be based upon the cost variable score calculated according to step 515. Furthermore, the model service score calculated for the classified data in the context of each of the plurality of model services optionally may be based upon the client configuration score calculated according to step 520. In the event that the model service score calculated for the classified data in the context of each of the plurality of model services is based upon more than one of the social media score calculated according to step 510, the cost variable score calculated according to step 515, and the client configuration score calculated according to step 520, the model advisor may calculate the model service score by averaging or aggregating the respective scores. In an embodiment, the model advisor may calculate the model service score by weighting the social media score, the cost variable score, and the client configuration score evenly and subsequently averaging or aggregating the three scores (or averaging or aggregating a subset of the three scores). In an alternative embodiment, the model advisor may calculate the model service score by applying different weight values to the social media score, the cost variable score, and the client configuration score and subsequently averaging or aggregating the three scores (or averaging or aggregating a subset of the three scores) based upon the uneven weighting. By applying uneven weighting according to such alternative embodiment, the model advisor may emphasize one or more predefined factors over the other predefined factor(s). For instance, upon determining that social media trends are of relatively greater importance with respect to the classified data than cost variable(s) or client configuration, the model advisor may calculate the model service score by applying a higher weight to the social media score relative to the cost variable score and the client configuration score.

Upon selecting at least one model service according to step 525, at step 530 the model advisor may store in the prediction database an association between the client service request and the selected at least one model service. By storing such association in the prediction database, the model advisor may provide a prediction including the selected at least one model service upon receipt of a subsequent client service request that corresponds to the client service request, thus avoiding unnecessary repetition of steps 505-525. Furthermore, at step 530 the model advisor may store the client service request (or a reference thereto) in the prediction database along with the association between the client service request and the selected at least one model service. For instance, in context of the method 300, in a subsequent session the model advisor may determine at step 305 that a subsequent client service request corresponds to the client service request as stored according to step 530, and at step 310 the model advisor may select the at least one model service associated with the stored client service request consequent to storage of the association according to step 530.

Figure 6:
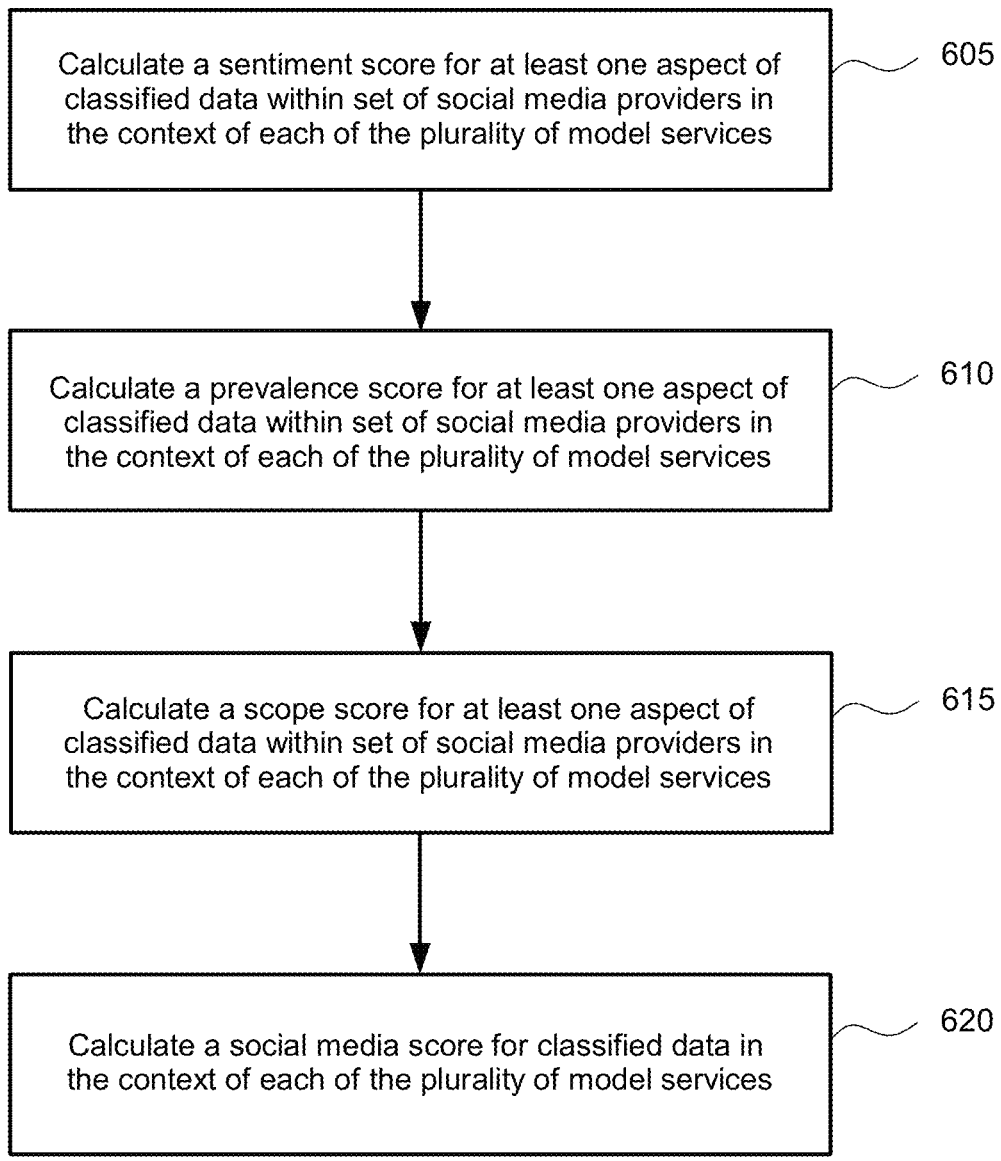
FIG. 6 illustrates a method of measuring classified data associated with a client service request based upon social media trends, according to an embodiment.

FIG. 6 illustrates a method 600 of measuring the classified data associated with the client service request based upon the social media trends, according to an embodiment. The method 600 provides an example embodiment with respect to step 510 of the method 500. The method 600 may begin at step 605, where the model advisor may calculate a sentiment score for at least one aspect of the classified data within a set of social media providers in the context of each of the plurality of model services. Sentiment associated with an aspect within the set of social media providers in the context of the various embodiments described herein may refer to feeling, emotion, and/or attitude. Specifically, the model advisor may calculate a sentiment score based upon level of sentiment (e.g., high/low sentiment) and polarity of sentiment (e.g., positive/neutral/negative sentiment) associated with at least one aspect of the classified data (e.g., at least one topic, at least one intent, at least one entity, at least one potential action, and/or at least one keyword) in the context of each of the plurality of model services. For example, for each of the plurality of model services, the model advisor may calculate a sentiment score having a level of sentiment portion and a polarity of sentiment portion to assess any reference(s) to the at least one aspect of the classified data within the set of social media providers in the context of the model service. In the example, a sentiment score indicating high positive social media sentiment with respect to the at least one aspect in the context of a certain model service may indicate relatively higher likelihood that such model service may appropriately address the at least one aspect of the classified data associated with the client service request. Conversely, in the example, a sentiment score indicating high negative social media sentiment with respect to the at least one aspect in the context of a certain model service may indicate relatively lower likelihood that such model service may appropriately address the at least one aspect. In an alternative embodiment, for each of the plurality of model services, the model advisor may calculate a sentiment score having either a level of sentiment portion or a polarity of sentiment portion (but not both) to assess any reference(s) to the at least one aspect of the classified data within the set of social media providers in the context of the model service.

In a further embodiment, the model advisor may calculate multiple respective sentiment scores for multiple aspects of the classified data within the set of social media providers in the context of each of the plurality of model services. According to such embodiment, the model advisor may average or aggregate the multiple respective sentiment scores into a single sentiment score for the classified data in the context of each of the plurality of model services. For instance, in the event that the model advisor calculates one sentiment score with respect to Topic A and another sentiment score with respect to Topic B in the context of each of the plurality of model services, the model advisor may average or aggregate the sentiment scores calculated with respect to Topic A and with respect to Topic B into a single sentiment score for the classified data in the context of each of the plurality of model services.

At step 610, the model advisor may calculate a prevalence score for at least one aspect of the classified data within the set of social media providers in the context of each of the plurality of model services. The prevalence of an aspect within the set of social media providers in the context of the various embodiments described herein may refer to the strength or prominence of such aspect within the set of social media providers. Specifically, the model advisor may calculate a prevalence score based upon a number of references to at least one aspect of the classified data (e.g., at least one topic, at least one intent, at least one entity, at least one potential action, and/or at least one keyword) within the set of social media providers in the context of each of the plurality of model services. For instance, for each of the plurality of model services, the model advisor may calculate a prevalence score reflecting a prevalence ratio, e.g., a ratio of a number of references to the at least one aspect in content posts within the set of social media providers in the context of the model service to the total number of content posts within the set of social media providers. In the example, a higher calculated prevalence ratio (and thus a higher prevalence score) with respect to the at least one aspect of the classified data in the context of a certain model service may indicate relatively higher likelihood that such model service may appropriately address the at least one aspect of the classified data associated with the client service request. Conversely, in the example, a lower calculated prevalence ratio (and thus a lower prevalence score) with respect to the at least one aspect of the classified data in the context of a certain model service may indicate relatively lower likelihood that such model service may appropriately address the at least one aspect.

In a further embodiment, the model advisor may calculate multiple respective prevalence scores for multiple aspects of the classified data within the set of social media providers in the context of each of the plurality of model services. According to such embodiment, the model advisor may average or aggregate the multiple respective prevalence scores into a single prevalence score for the classified data. For instance, in the event that the model advisor calculates one prevalence score with respect to Topic C and another prevalence score with respect to Topic D in the context of each of the plurality of model services, the model advisor may average or aggregate the prevalence scores calculated with respect to Topic C and with respect to Topic D into a single prevalence score for the classified data in the context of each of the plurality of model services.

At step 615, the model advisor may calculate a scope score for at least one aspect of the classified data within the set of social media providers in the context of each of the plurality of model services. The scope of an aspect within the set of social media providers in the context of the various embodiments described herein may refer to the reach or range of influence of such aspect within the set of social media providers. Specifically, the model advisor may calculate a scope score based upon a number of users within the set of social media providers that discuss at least one aspect of the classified data (e.g., at least one topic, at least one intent, at least one entity, at least one potential action, and/or at least one keyword) in the context of each of the plurality of model services. For example, for each of the plurality of model services, the model advisor may calculate a scope score reflecting a scope ratio, e.g., a ratio of a number of users that discuss the at least one aspect within the set of social media providers in the context of the model service to the total number of users within the set of social media providers. In the example, a higher calculated scope ratio (and thus a higher scope score) with respect to the at least one aspect in the context of a certain model service may indicate relatively higher likelihood that such model service may appropriately address the at least one aspect of the classified data associated with the client service request. Conversely, in the example, a lower calculated scope ratio (and thus a lower scope score) with respect to the at least one aspect in the context of a certain model service may indicate relatively lower likelihood that such model service may appropriately address the at least one aspect.

In a further embodiment, the model advisor may calculate multiple respective scope scores for multiple aspects of the classified data within the set of social media providers in the context of each of the plurality of model services. According to such embodiment, the model advisor may average or aggregate the multiple respective scope scores into a single scope score for the classified data. For instance, in the event that the model advisor calculates one scope score with respect to Topic E and another scope score with respect to Topic F in the context of each of the plurality of model services, the model advisor may average or aggregate the scope scores calculated with respect to Topic E and with respect to Topic F into a single scope score for the classified data in the context of each of the plurality of model services.

In an embodiment, the model advisor may calculate the sentiment score, the prevalence score, and/or the scope score in the context of each of the plurality of model services by focusing upon the same aspect(s) of the classified data for purposes of each calculation. For instance, the model advisor may calculate the sentiment score, the prevalence score, and the scope score in the context of each of the plurality of model services by focusing upon Topic A within the classified data. In an alternative embodiment, the model advisor may calculate the sentiment score, the prevalence score, and/or the scope score in the context of each of the plurality of model services by focusing upon different aspects of the classified data for purposes of each calculation. For instance, the model advisor may calculate the sentiment score, the prevalence score, and the scope score in the context of each of the plurality of model services by focusing upon Topic A within the classified data in order to calculate the sentiment score, by focusing upon Topic B within the classified data in order to calculate the prevalence score, and by focusing upon Intent C and Entity D within the classified data in order to calculate the scope score.

At step 620, in the context of each of the plurality of model services, the model advisor may calculate the social media score for the classified data based upon all of, or a subset of, the respective scores calculated in steps 605-615, namely the sentiment score, the prevalence score, and/or the scope score. In the event that the social media score calculated in the context of each of the plurality of model services is based upon more than one of the sentiment score calculated according to step 605, the prevalence score calculated according to step 610, and the scope score calculated according to step 615, the model advisor may calculate the social media score by averaging or aggregating the respective scores. In an embodiment, the model advisor may calculate the social media score by weighting the sentiment score, the prevalence score, and the scope score evenly and subsequently averaging or aggregating the three scores (or averaging or aggregating a subset of the three scores). In an alternative embodiment, the model advisor may calculate the social media score by applying different weight values to the sentiment score, the prevalence score, and the scope score respectively and subsequently averaging or aggregating the three scores (or averaging or aggregating a subset of the three scores) based upon the uneven weighting. By applying uneven weighting according to such alternative embodiment, the model advisor may emphasize one or more social media trends over the other social media trend(s). For instance, upon determining that social media sentiment is of relatively greater importance with respect to the classified data than social media prevalence or social media scope, the model advisor may calculate the social media score by applying a higher weight to the sentiment score relative to the prevalence score and the scope score.

In a further alternative embodiment, the social media score may incorporate score(s) calculated with respect to one or more additional social media trends. The calculated social media score for a given model service may indicate the likelihood that such model service may appropriately address at least one aspect of the classified data associated with the client service request. The model advisor may execute all steps or a subset of steps 605-615 of the method 600. Additionally, the model advisor may execute steps 605-615 in any order. By calculating one or more scores according to the method 600 in order to measure social media trends, the model advisor may determine the relative compatibility of one or more aspects associated with the client service request in the context of each of the plurality of model services.

Figure 7:
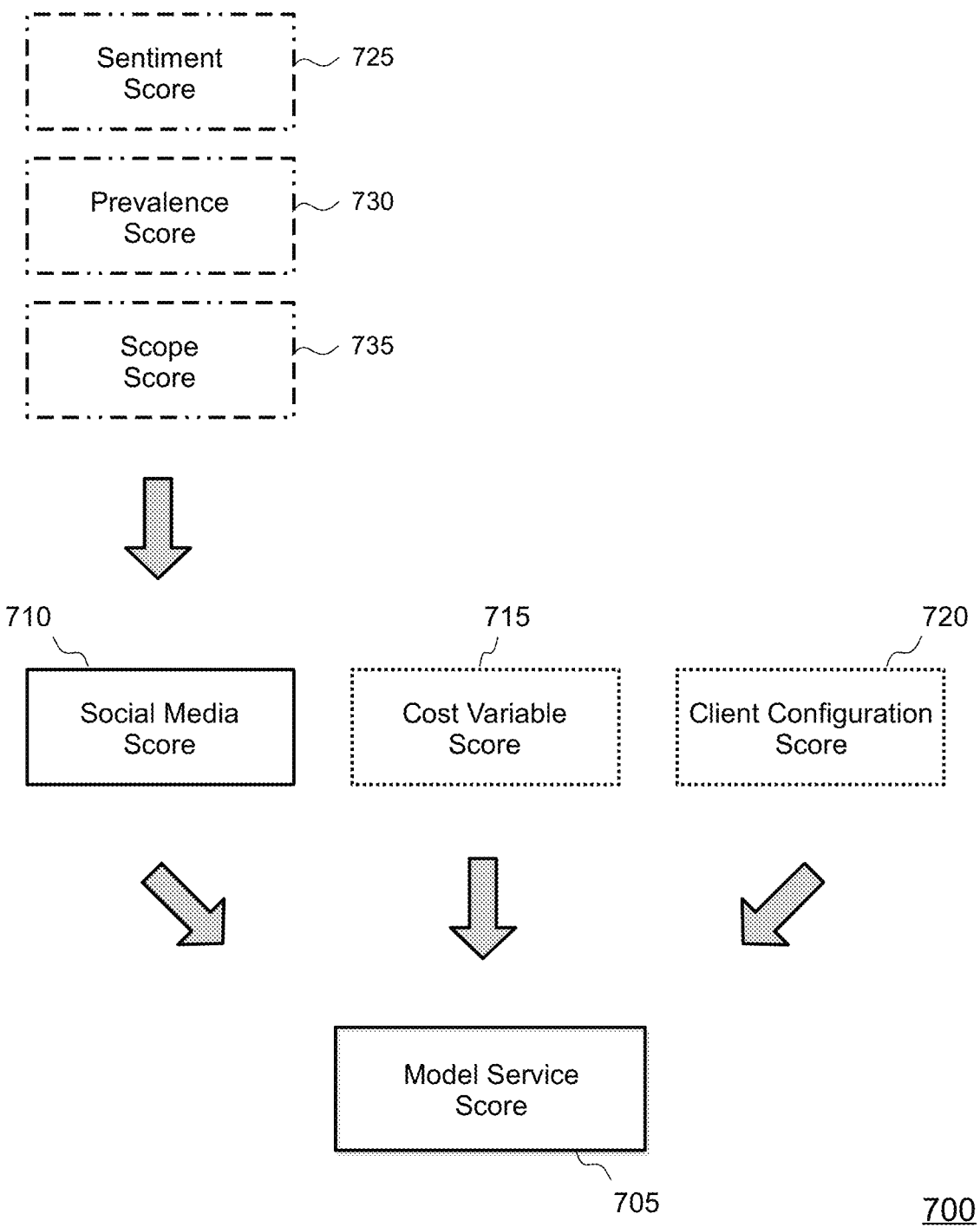
FIG. 7 illustrates a schematic diagram with respect to calculating a model service score for classified data associated with a client service request in the context of each of a plurality of conversational agent learning model services, according to an embodiment.

FIG. 7 illustrates a schematic diagram 700 with respect to calculating a model service score 705 for the classified data in the context of each of the plurality of model services, according to an embodiment. The model advisor may calculate model service score 705 for the classified data in the context of each of the plurality of model services in accordance with a previously described embodiment of step 525. Specifically, the model advisor may calculate model service score 705 based upon a social media score 710 calculated according to step 510. Optionally, the model advisor further may calculate model service score 705 based upon a cost variable score 715 calculated according to step 515. Optionally, the model advisor further may calculate model service score 705 based upon a client configuration score 720 calculated according to step 520. In the event that model service score 705 is based upon more than one of social media score 710, cost variable score 715, and client configuration score 720, the model advisor may calculate model service score 705 by averaging or aggregating the respective scores. As previously described, the respective scores may be weighted evenly or unevenly.

In accordance with an embodiment previously described with respect to the method 600, the model advisor may calculate social media score 710 for the classified data in the context of each of the plurality of model services according to step 620 based upon sentiment score 725 calculated according to step 605, prevalence score 730 calculated according to step 610, and/or scope score 735 calculated according to step 615. In the event that social media score 710 is based upon more than one of sentiment score 725, prevalence score 730, and scope score 735, the model advisor may calculate social media score 710 by averaging or aggregating the respective scores. As previously described, the respective scores may be weighted evenly or unevenly.

The descriptions of the various embodiments of the present invention have been presented for purposes of illustration but are not intended to be exhaustive or limited to the embodiments disclosed. All kinds of modifications made to the described embodiments and equivalent arrangements should fall within the protected scope of the invention. Hence, the scope of the invention should be explained most widely according to the claims that follow in connection with the detailed description, and should cover all possibly equivalent variations and equivalent arrangements. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
   receiving a client service request associated with a client system and data associated with the client service request, wherein the data associated with the client service request includes at least one keyword extracted from the client service request and context information;
   based upon the data associated with the client service request, selecting at least one model service among a plurality of model services associated with a conversational agent learning model, wherein selecting the at least one model service comprises, responsive to determining that no stored service request among a plurality of stored service requests referenced in a prediction database corresponds to the client service request, evaluating the client service request as follows:
      classifying the data associated with the client service request;
      measuring the classified data based upon multiple predefined factors selected from the group consisting of social media trends, at least one cost variable, and client configuration in terms of network location or assets of the client system;
      selecting the at least one model service responsive to measuring the classified data; and
      storing in the prediction database an association between the client service request and the selected at least one model service;
   and
   providing the selected at least one model service to the client system in response to the client service request.

2. The method of claim 1, wherein the context information includes data associated with the client system and information regarding at least one service request related to the client service request.

3. The method of claim 1, wherein selecting the at least one model service further comprises:
   responsive to determining that a stored service request among the plurality of stored service requests corresponds to the client service request by determining via text comparison or natural language processing that the stored service request meets keyword or topical input criteria associated with the client service request and further by determining that the stored service request satisfies at least one predetermined threshold of similarity with respect to the client service request, selecting the at least one model service based upon association with the stored service request.

4. The method of claim 1, wherein selecting the at least one model service responsive to measuring the classified data comprises comparing model service scores respectively calculated for the classified data in the context of each of the plurality of model services, and wherein the model service scores are respectively calculated based upon averaging or aggregating multiple scores selected from the group consisting of social media score, cost variable score, and client configuration score.

5. The method of claim 1, wherein measuring the classified data based upon the social media trends comprises:
   calculating a sentiment score for at least one aspect of the classified data within a set of social media providers in the context of each of the plurality of model services.

6. The method of claim 1, wherein measuring the classified data based upon the social media trends comprises:
   calculating a prevalence score for at least one aspect of the classified data within a set of social media providers in the context of each of the plurality of model services.

7. The method of claim 1, wherein measuring the classified data based upon the social media trends comprises:
   calculating a scope score for at least one aspect of the classified data within a set of social media providers in the context of each of the plurality of model services.

8. A computer program product comprising a computer readable storage medium having program instructions embodied therewith, the program instructions executable by a computing device to cause the computing device to:
   receive a client service request associated with a client system and data associated with the client service request, wherein the data associated with the client service request includes at least one keyword extracted from the client service request and context information;
   based upon the data associated with the client service request, select at least one model service among a plurality of model services associated with a conversational agent learning model, wherein selecting the at least one model service comprises, responsive to determining that no stored service request among a plurality of stored service requests referenced in a prediction database corresponds to the client service request, evaluating the client service request as follows:

classifying the data associated with the client service request;

measuring the classified data based upon multiple predefined factors selected from the group consisting of social media trends, at least one cost variable, and client configuration in terms of network location or assets of the client system;

selecting the at least one model service responsive to measuring the classified data; and storing in the prediction database an association between the client service request and the selected at least one model service;

and provide the selected at least one model service to the client system in response to the client service request.

9. The computer program product of claim 8, wherein the context information includes data associated with the client system and information regarding at least one service request related to the client service request.

10. The computer program product of claim 8, wherein selecting the at least one model service further comprises:

responsive to determining that a stored service request among the plurality of stored service requests corresponds to the client service request by determining via text comparison or natural language processing that the stored service request meets keyword or topical input criteria associated with the client service request and further by determining that the stored service request satisfies at least one predetermined threshold of similarity with respect to the client service request, selecting the at least one model service based upon association with the stored service request.

11. The computer program product of claim 8, wherein selecting the at least one model service responsive to measuring the classified data comprises comparing model service scores respectively calculated for the classified data in the context of each of the plurality of model services, and wherein the model service scores are respectively calculated based upon averaging or aggregating multiple scores selected from the group consisting of social media score, cost variable score, and client configuration score.

12. A system comprising:

a processor; and a memory storing an application program, which, when executed on the processor, performs an operation comprising:

receiving a client service request associated with a client system and data associated with the client service request, wherein the data associated with the client service request includes at least one keyword extracted from the client service request and context information;

based upon the data associated with the client service request, selecting at least one model service among a plurality of model services associated with a conversational agent learning model, wherein selecting the at least one model service comprises, responsive to determining that no stored service request among a plurality of stored service requests referenced in a prediction database corresponds to the client service request, evaluating the client service request as follows:

classifying the data associated with the client service request;

measuring the classified data based upon multiple predefined factors selected from the group consisting of social media trends, at least one cost variable, and client configuration in terms of network location or assets of the client system;

selecting the at least one model service responsive to measuring the classified data; and storing in the prediction database an association between the client service request and the selected at least one model service;

and providing the selected at least one model service to the client system in response to the client service request.

13. The system of claim 12, wherein selecting the at least one model service further comprises:

responsive to determining that a stored service request among the plurality of stored service requests corresponds to the client service request by determining via text comparison or natural language processing that the stored service request meets keyword or topical input criteria associated with the client service request and further by determining that the stored service request satisfies at least one predetermined threshold of similarity with respect to the client service request, selecting the at least one model service based upon association with the stored service request.

14. The system of claim 12, wherein selecting the at least one model service responsive to measuring the classified data comprises comparing model service scores respectively calculated for the classified data in the context of each of the plurality of model services, and wherein the model service scores are respectively calculated based upon averaging or aggregating multiple scores selected from the group consisting of social media score, cost variable score, and client configuration score.

* * * * *